US 8,209,629 B2

(12) United States Patent
Laurie et al.

(10) Patent No.: US 8,209,629 B2
(45) Date of Patent: Jun. 26, 2012

(54) CONTEXT PANE WITH SEMANTIC ZOOM

(75) Inventors: Avrum Stephen Laurie, Seattle, WA (US); Michael B. Palmer, Edmonds, WA (US); Erik Theodore Bergman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 708 days.

(21) Appl. No.: 12/356,093

(22) Filed: Jan. 20, 2009

(65) Prior Publication Data

US 2010/0185978 A1 Jul. 22, 2010

(51) Int. Cl.
*G06F 3/048* (2006.01)
(52) U.S. Cl. .......................... 715/800; 715/751; 715/777
(58) Field of Classification Search .................. 715/800, 715/708, 714, 751, 759, 777, 788, 798, 799
See application file for complete search history.

(56) References Cited

U.S. PATENT DOCUMENTS

| | | | | |
|---|---|---|---|---|
| 5,708,825 | A * | 1/1998 | Sotomayor | 715/205 |
| 5,838,323 | A * | 11/1998 | Rose et al. | 715/236 |
| 6,271,840 | B1 * | 8/2001 | Finseth et al. | 715/236 |
| 6,683,633 | B2 * | 1/2004 | Holtzblatt et al. | 715/854 |
| 7,068,288 | B1 | 6/2006 | Good et al. | |
| 7,143,349 | B2 * | 11/2006 | Marukawa | 715/255 |
| 7,228,302 | B2 | 6/2007 | Kuchinsky et al. | |
| 7,234,942 | B2 * | 6/2007 | Hu et al. | 434/178 |
| 7,262,772 | B2 * | 8/2007 | Ebert | 345/440 |
| 7,345,688 | B2 | 3/2008 | Baudisch et al. | |
| 7,386,801 | B1 * | 6/2008 | Horvitz et al. | 715/764 |
| 7,493,639 | B2 * | 2/2009 | Lawler et al. | 725/40 |
| 2004/0165010 | A1 * | 8/2004 | Robertson et al. | 345/805 |
| 2004/0205514 | A1 * | 10/2004 | Sommerer et al. | 715/501.1 |
| 2005/0033747 | A1 * | 2/2005 | Wittkotter | 707/10 |
| 2005/0047629 | A1 | 3/2005 | Farrell et al. | |
| 2006/0041830 | A1 * | 2/2006 | Bohn | 715/501.1 |
| 2006/0195461 | A1 * | 8/2006 | Lo et al. | 707/100 |
| 2006/0242585 | A1 * | 10/2006 | Cutsinger et al. | 715/744 |
| 2006/0271887 | A1 | 11/2006 | Bier et al. | |
| 2007/0288247 | A1 | 12/2007 | Mackay | |
| 2009/0064057 | A1 * | 3/2009 | Bull et al. | 715/864 |
| 2010/0082695 | A1 * | 4/2010 | Hardt | 707/798 |

OTHER PUBLICATIONS

Pattison, et al., "Information Visualisation using Composable Layouts and Visual Sets", Retrieved at <<http://crpit.com/confpapers/CRPITV9Pattison1.pdf>>, Australian Symposium on Information Visualisation, Sydney, Dec. 2001, Conferences in Research and Practice in Information Technology, vol. 9, pp. 10.
Nataraj, et al., "Viewpoint: A Zoomable User Interface for Naked Objects", Retrieved at <<http://www.ele.auckland.ac.nz/~p4p_2005/archive/reports2003/pdfs/p76_mnat010.pdf>>, 2003, pp. 1-48.

(Continued)

*Primary Examiner* — Weilun Lo
*Assistant Examiner* — Rashedul Hassan
(74) *Attorney, Agent, or Firm* — Hope Baldauff Hartman, LLC

(57) ABSTRACT

Technologies are described herein for providing a context pane with semantic zoom. A content interface including a content pane and a context pane is provided. The content pane may be adapted to provide content, and the context pane may be adapted to display a richness of contextual data. A selectable interface element is also provided in the content interface. When the interface element is selected, the context pane may be transformed from displaying the richness of contextual data into displaying another richness of contextual data.

17 Claims, 9 Drawing Sheets

OTHER PUBLICATIONS

Perlin et al., "Pad: An Alternative Approach to the Computer Interface", Aug. 2-6, 1993, Proc. of the 20$^{th}$ Annual Conf. on Computer Graphics and Interactive Techniques, Retrieved at http://mri.nyu.edu/publications/sig93-pad/siggraph-93-origpad.pdf, pp. 1-11.

Andre et al., "Continuum: Designing Timelines for Hierarchies, Relationships and Scale", Oct. 7-10 2007, Proc. of the 20$^{th}$ Annual ACM Symp. On User Interface Software and Technology, Retrieved at http://eprints.ecs.soton.ac.uk/13818/1/continuum-rev.pdf, pp. 10.

\* cited by examiner

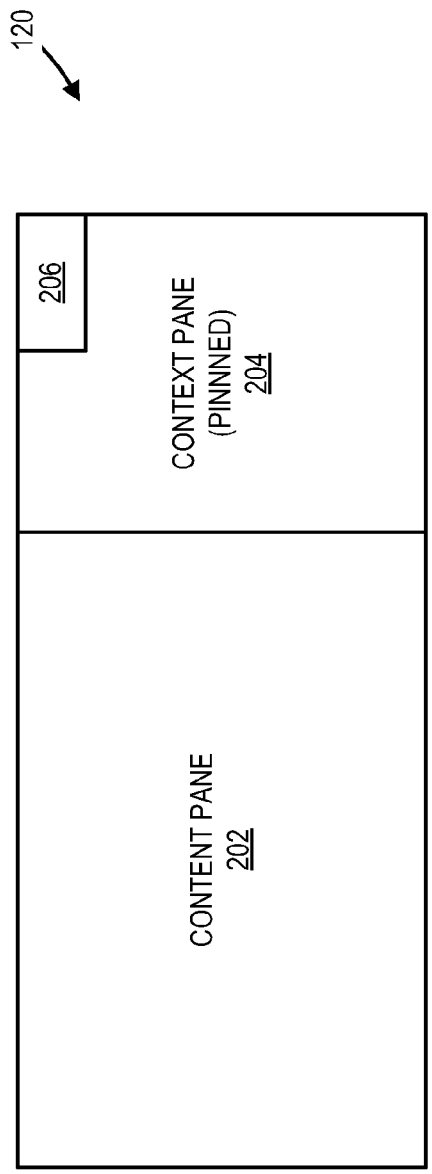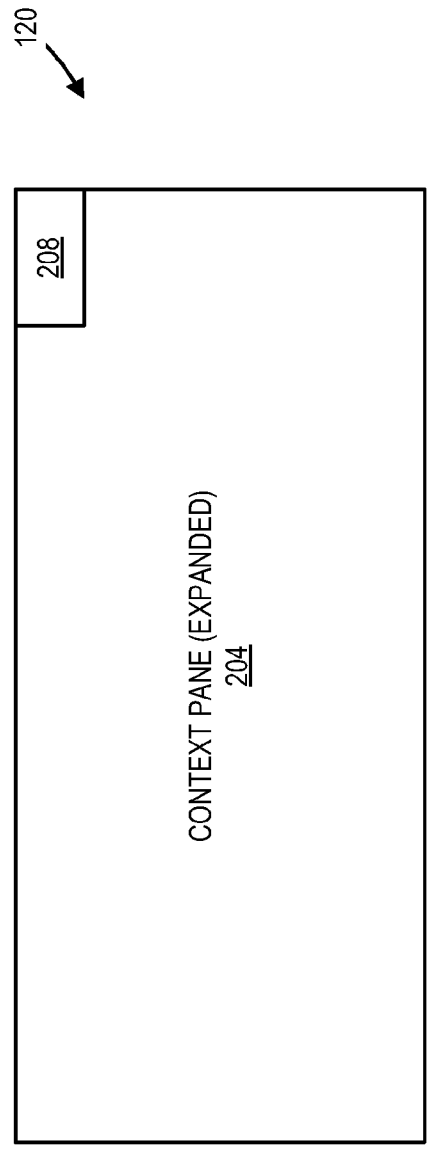

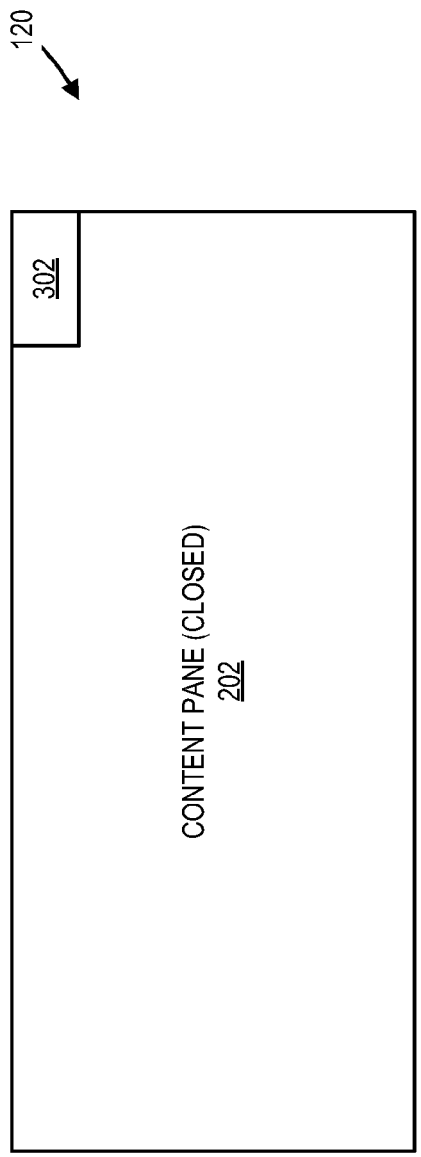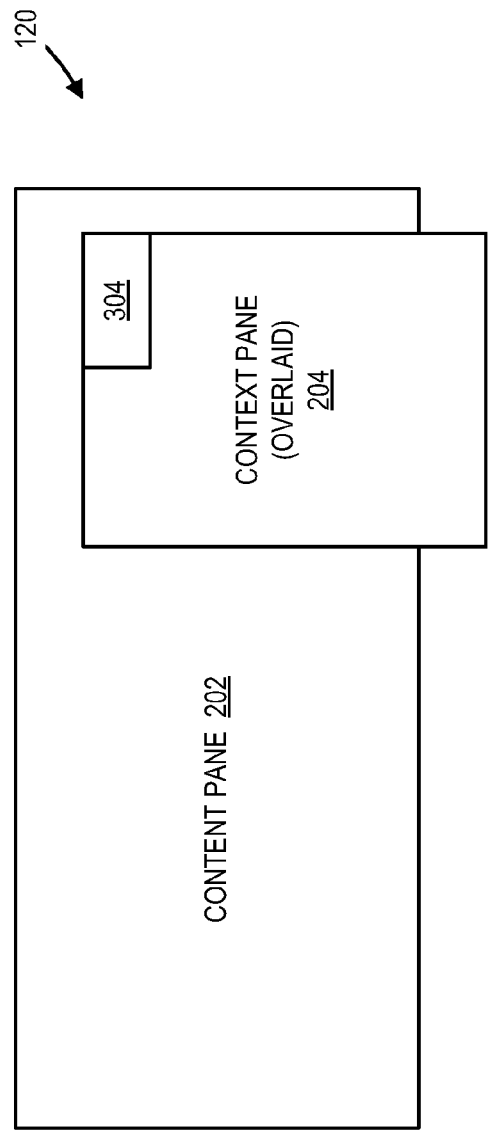

CONTEXT PANE WITH SEMANTIC ZOOM

BACKGROUND

Collaborative environments are becoming increasingly popular as users demand greater access to and interaction with shared content, such as word processing documents, spreadsheets, presentations, and the like. In particular, collaborative environments can provide multiple users access to shared content for a variety of purposes, such as retrieving, viewing, editing, and commenting on the content. In order to facilitate greater access to shared content, the content may be hosted on a central database coupled to a World Wide Web ("web") server. In this way, a user can access the content through a web browser, for example, on any suitable computing device and at remote locations.

Upon receiving a request from the web browser, a web server may be operative to provide a user interface, which is displayed on a user's monitor, enabling the user to access the content stored in the database. Organizing and displaying the shared content in a way that is conducive to productive interaction with the content is a significant challenge for user interface developers. For example, the database may store multiple documents, each of which is associated with different metadata generated by the users sharing the documents. In this regard, the user interface may be designed such that users can retrieve, view, edit, and interact with not only the documents but also with the associated metadata in an effective manner. However, solutions for effectively interacting with documents and associated metadata do not currently exist.

It is with respect to these considerations and others that the disclosure made herein is presented.

SUMMARY

Technologies are described herein for providing a context pane with semantic zoom. In particular, the context pane may be provided through a content interface that may also include a content pane. The content pane may display content, such as documents and other media. The context pane may display contextual data associated with the content.

The context interface may be configured to operate with semantic zoom. With semantic zoom, the richness of contextual data displayed in the context pane may be dynamically adjusted based on the size and arrangement of the context pane. The context pane may be displayed in various sizes and arrangements, each of which corresponds to a particular state of the context pane. Each state of the context pane may correspond to a level of richness of contextual data displayed in the context pane. The richness of contextual data may be defined as the level of granularity of the contextual data displayed in the context pane. As the context pane becomes smaller, the richness of contextual data displayed in the context pane may decrease accordingly. As the context pane becomes larger, the richness of contextual data displayed in the context pane may increase accordingly.

According to one embodiment presented herein, a content interface including a content pane and a context pane is provided. The content pane may be adapted to provide content, and the context pane may be adapted to display a richness of contextual data. A selectable interface element is also provided in the content interface. When the interface element is selected, the context pane may be transformed from displaying the richness of contextual data into displaying another richness of contextual data.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 2A-2B are diagrams showing a two-state configuration of a content interface including a content pane and a context pane with semantic zoom;

FIGS. 3A-3D are diagrams showing a four-state configuration of a content interface including a content pane and a context pane with semantic zoom;

DETAILED DESCRIPTION

The following detailed description is directed to technologies for providing a context pane with semantic zoom. Through the utilization of the technologies and concepts presented herein, a user interface may include a content pane and a context pane with semantic zoom. In particular, the content pane may be operative to display a list of content and/or the content itself, while the context pane may be operative to display contextual data, which is metadata associated with the content. Semantic zoom provides an optimized viewing experience by dynamically adjusting the richness of contextual data displayed within the context pane in accordance with a given state of the context pane.

As used herein, the richness of contextual data may refer to the level of granularity of the information displayed in the context pane. For example, a richer (also referred to as a more complete) view of contextual data may refer to a higher granularity of information, while a less rich (also referred to as a less complete) view of contextual data may refer to a lower granularity of information. A complete view of contextual data may refer to the deepest level of the semantic zoom, which displays the richest, most detailed information.

According to embodiments, the richness of contextual data may be defined by the types of information shown in the context pane, as opposed to merely the amount of information shown in the context pane. For example, a less rich view of contextual data may simply display a name of a user, while a richer view of contextual data may display the name of the user, the status of the user, and the user's friends. In this way, the richer view of contextual data may add, edit, and/or delete types of information from the less rich view of contextual data in order to provide a higher granularity of information.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
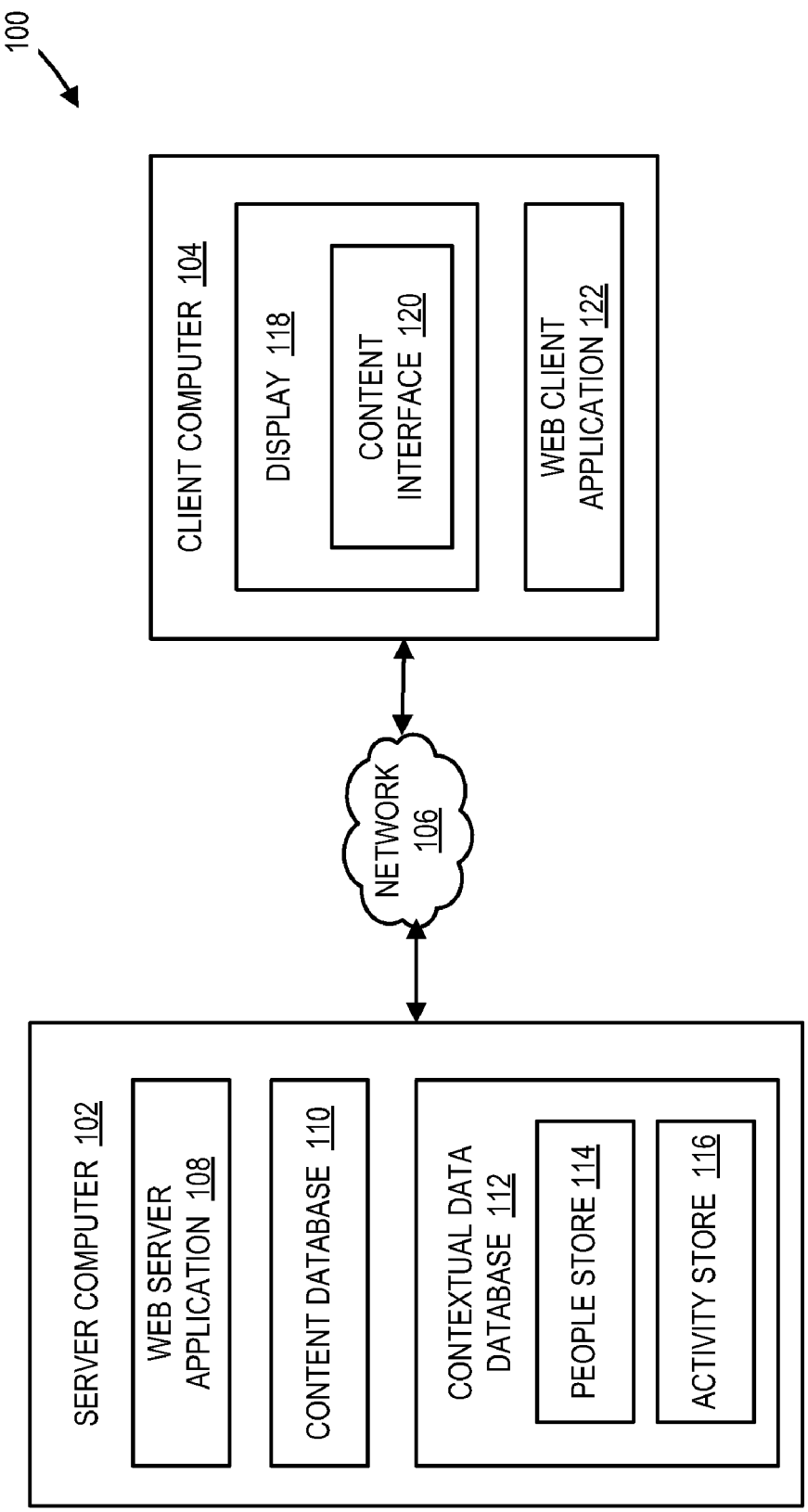
FIG. 1 is a network architecture diagram showing a network architecture capable of providing a context pane with semantic zoom.

In the following detailed description, references are made to the accompanying drawings that form a part hereof, and which are shown by way of illustration specific embodiments or examples. Referring now to the drawings, in which like numerals represent like elements through the several figures, a computing system and methodology for providing a context pane with semantic zoom will be described. In particular, FIG. 1 illustrates a simplified network architecture 100 including a server computer 102 coupled to a client computer 104 via a network 106. The network 106 may be any suitable network, such as a local area network ("LAN") or the Internet. In one embodiment, the network 106 is a private network, such as an enterprise network. Although only one client computer 104 is illustrated in FIG. 1, the network architecture 100 may include multiple client computers coupled to the to the server computer 102 in any suitable network configuration.

As shown in FIG. 1, the server computer 102 includes a web server application 108, a content database 110, and a contextual data database 112. The content database 110 is operative to store any suitable multimedia content, such as text, images, audio, video, and combinations thereof. In one embodiment, the content database 110 stores documents. Access to content in the content database 110 may be limited to users in a particular workspace, according to one embodiment. As used herein, a workspace refers to a single sharing network, such as an intranet or a workgroup. In other embodiments, access to content in the content database 110 may be publicly accessible and not limited to users in a particular workspace.

The contextual data database 112 is operative to store contextual data, which, as used herein, refers to any suitable metadata associated with the content stored in the content database 110. For example, the contextual data database 112 may include a people store 114 containing data that identifies people who are authorized to view, edit, and/or comment on the content stored in the content database 110. The people store 114 may include a variety of user information, such as images, online status, and biographical information, about each person.

The contextual data database 112 may further include an activity store 116 containing activities performed by people in the people store 114. Examples of activities include, but are not limited to, joining a group, leaving a group, viewing the content, editing the content, and commenting on the content. Other metadata that can be stored in the contextual data database 112 may include calendars and tasks. It should be appreciated that the metadata associated with different pieces of content may also differ. For example, the people authorized to the view and edit one document may be different from the people authorized to view and edit another document.

Also shown in FIG. 1, the client computer 104 includes a display 118 capable of displaying a content interface 120. In one embodiment, the content interface 120 is retrieved from the server computer 102 via the web client application 122 and the web server application 108. The web client application 122 may be any suitable application operative to send requests for data to the web server application 108, to receive the data in response to sending the request, and to process the data for display on the display 118. In one embodiment, the web client application 122 is a web browser. The content interface 120 is described in greater detail below with respect to FIGS. 2A-2B and 3A-3D.

Turning now to FIGS. 2A-2B and FIGS. 3A-3D, illustrative configurations of the content interface 120 are shown. According to embodiments, the content interface 120 can be presented in one of a plurality of discrete or non-discrete states, each of which corresponds to a size and arrangement of a content pane 202 and a context pane 204. The discrete states may include a distinct number of states, while non-discrete states may include a continuous spectrum of states. The content interface 120 may dynamically adjust the richness of contextual data shown in the context pane 204 based on the size and position of the context pane 204. The content interface 120 may also dynamically adjust the richness of contextual data shown in the context pane 204 in accordance with a user input via a slider (not shown) or other suitable user interface mechanism. FIGS. 2A-2B show an illustrative configuration of the content interface 120 including two states: a pinned state and an expanded state. FIGS. 3A-3D show another illustrative configuration of the content interface 120 including four states: a closed state, an overlaid state, a pinned state, and an expanded state. It should be appreciated that the states illustrated in FIGS. 2A-2B and FIGS. 3A-3D are merely examples and are not intended to be limiting.

FIG. 2A shows an illustrative implementation of the content interface 120 in the pinned state. As shown in FIG. 2A, the content interface 120 is configured such that the content pane 202 and the context pane 204 are in a side-by-side orientation. In the pinned state, the context pane 204 is in a minimal state (as compared with the maximal state described below with respect to FIG. 2B) where a significant amount of content is displayed in the content pane 202. The content pane 202 is operative to display a list of content or the content itself. For example, the content pane 202 may display a document grid containing a list of documents. The list of documents may be organized, categorized, and/or arranged in any suitable manner. The content may be provided from the content database 110. A user may select one of the documents from the document grid and thereby cause the content pane 202 to display the selected document in place of the document grid.

The context pane 204 is operative to provide contextual data related to the content displayed in the content pane 202. In one embodiment, the context pane 204 is subordinate to the content pane 202. That is, the context pane 204 is subordinate to the content pane 202 if the contextual data displayed in the context pane 204 relates to no greater than the content displayed in the content pane 202. For example, if the content pane 202 displays a document grid, the context pane 204 may display contextual data associated with all of the documents in the document grid. As previously described, a user may select one of the documents in the document grid and thereby cause the content pane 202 to display the selected document in place of the document grid. In this case, the user selecting one of the documents in the document grid also causes the context pane 204 to display contextual data related to only the selected document and not to other non-selected documents in the document grid. If the user returns to viewing the document grid in the content pane 202, then the context pane 204 also returns to displaying contextual data related to the documents in the document grid.

Due to the size of the context pane 204 relative to the content interface 120 and the size of most displays, such as the display 118, the amount of contextual data that can be displayed in the context pane 204 is generally limited. For example, the context pane 204 may only be capable of displaying a summary of the relevant contextual data or a portion of the relevant contextual data. As such, the pinned state provides the user with a simultaneous view of the content in the content pane 202 and the contextual data in the context pane 204. In some cases, however, the user may want a more complete view of the contextual data associated with the content in the content pane 202. To this end, the user may depress an expansion button 206 or trigger another suitable interface element to transform to the content interface 120 from the pinned state into the expanded state.

FIG. 2B shows an illustrative implementation of the content interface 120 in the expanded state. As shown in FIG. 2A, the content interface 120 is configured such that the context pane 204 utilizes the entire area of the content interface 120, taking over the space previously occupied by the content pane 202 in the pinned state. In the expanded state, the context pane 204 is in a maximal state where the content pane 202 is not visible. Due to the larger size of the context pane 204 in the expanded state as compared to the pinned state, the context pane 204 in the expanded state may be capable of displaying a greater amount of data. For example, the context pane 204 in the expanded state may display a complete view of the contextual data, while the context pane 204 in the pinned state may display only a summary of the contextual data. A user may return to the pinned state from the expanded state by depressing a collapse button 208 or by triggering another suitable interface element.

The ability for the content interface 120 to switch between the pinned state and the expanded state provides users an effective approach to accessing content and relevant contextual data associated with the content. In particular, the pinned state enables a user to concurrently view the content through the content pane 202 and at least a portion or a summary of the relevant contextual data in the context pane 204. If the user decides to focus on the contextual data, then the user can transform the content interface 120 from the pinned state into the expanded state. This flexibility to switch between the pinned state and the expanded state enables the user to view as much of the contextual data as necessary in light of viewing the content as well.

FIG. 3A shows an illustrative implementation of the content interface 120 in the closed state. As shown in FIG. 3A, the content interface 120 is configured such that the content pane 202 utilizes the entire area of the content interface 120. By maximizing the area of the display 118 where content is shown, the closed state is optimized for content viewing and is capable of displaying a maximum amount of content. For example, a user with no interest in contextual data may choose the closed state. In order to view contextual data in the context pane 204, the user may depress an overlaid button 302 or trigger another suitable interface element to transform the content interface 120 from the closed state into the overlaid state.

FIG. 3B shows an illustrative implementation of the content interface 120 in the overlaid state. As shown in FIG. 3B, the content interface 120 is configured such that the context pane 204 is overlaid on top of the content pane 202. That is, the content pane 202 is still present and utilizes the entire area of the content interface 120 like in the closed state. In one embodiment, in the overlaid state, the context pane 204 can be moved around by dragging the context pane 204 or through other suitable mechanisms. In another embodiment, in the overlaid state, the context pane 204 cannot be moved around. In one embodiment, the context pane 204 can be closed by clicking an area outside of the context pane 204, thereby transforming the content interface 120 from the overlaid state to the closed state of FIG. 3A. In other embodiments, the context pane 204 may be closed by depressing a separate button (not shown) or by triggering another suitable interface element.

The overlaid state may be operative to provide a summary of relevant contextual data or a portion of relevant contextual data similar to that provided in the pinned state of FIG. 2A. By overlaying the context pane 204 on top of the content pane 202 and enabling the context pane 204 to be easily moved around and closed, the overlaid state is optimized for viewing content in the same format as the closed state while concurrently viewing relevant contextual data. That is, any changes in to the formatting of content that might occur if the content pane 202 were resized are avoided. For example, the overlaid state may be appropriate for a quick view of contextual data without disrupting the viewing or editing of the content in the content pane 202.

As previously described, the context pane 204 may be closed, causing the content interface 120 to return to the closed state. Further, the context pane 204 can be pinned to the content interface 120 by depressing a pinned button 304 or by triggering another suitable interface element. In particular, depressing the pinned button 304 may transform the content interface 120 from the overlaid state into the pinned state.

Figure 3C:
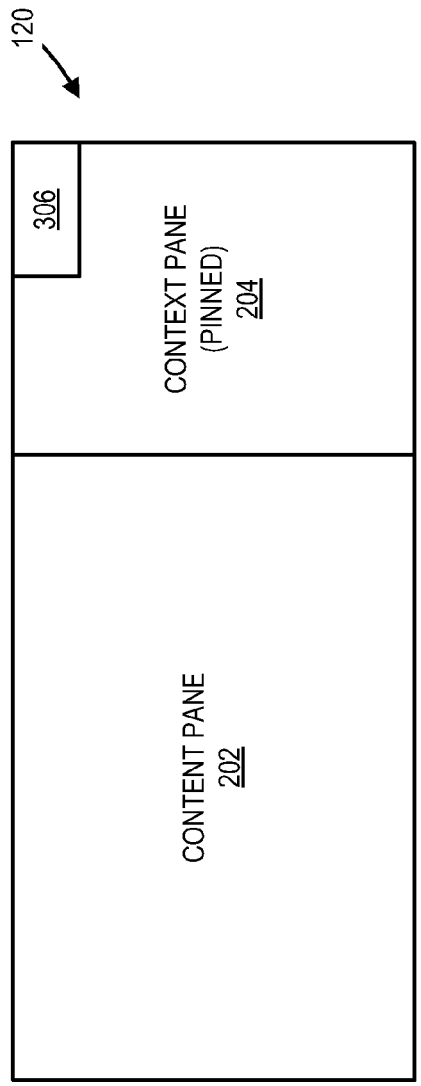

FIG. 3C shows an illustrative implementation of the content interface 120 in the overlaid state. As shown in FIG. 3C, the content interface 120 is configured such that the context pane 204 is pinned next to the content pane 202. Unlike in the overlaid state of FIG. 3B, in the pinned state the context pane 204 is fixed into a position on the content interface 120. That is, the context pane 204 cannot be moved while in the pinned state. The pinned state of FIG. 3C is similar to the pinned state of FIG. 2A previously described. The pinned state enables users to concurrently view content and associated contextual data in a side-by-side configuration. The pinned state may be utilized, for example, when a user desires a comparative analysis between the content and the relevant contextual data.

In one embodiment, the context pane 204 in the pinned state displays only a summary of relevant contextual data or a portion of relevant contextual data. In order to obtain a more complete view of contextual data in the context pane 204, the user may depress an expansion button 306 or trigger another suitable interface element to transform the content interface 120 from the pinned state into the expanded state.

Figure 3D:
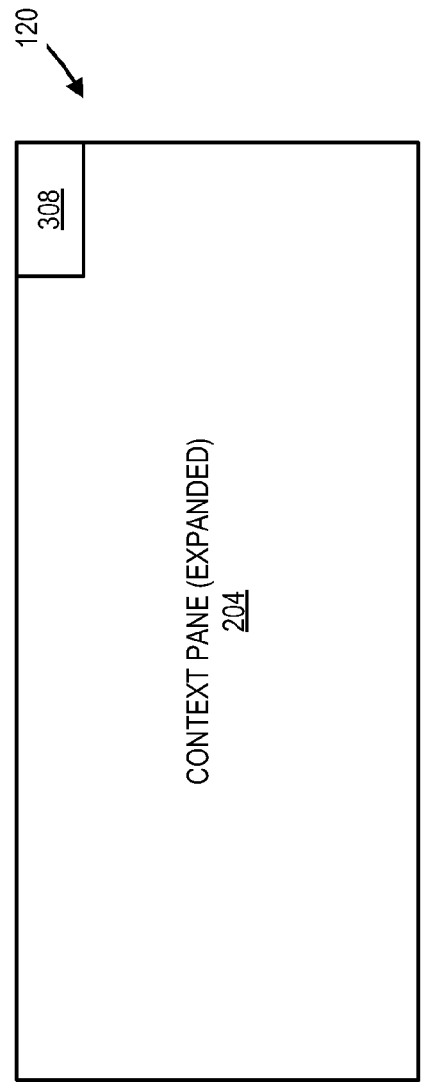

FIG. 3D shows an illustrative implementation of the content interface 120 in the expanded state. As shown in FIG. 3A, the content interface 120 is configured such that the context pane 204 utilizes the entire area of the content interface 120. By maximizing the area of the display 118 where contextual data is shown, the expanded state is optimized for contextual data viewing and is capable of displaying a maximum amount of contextual data. For example, a user may desire a complete view of the contextual data after reading a summary of the contextual data in the pinned state. The user may depress a button 308 or trigger another suitable interface element to convert the content interface 120 from the expanded state back into the pinned state.

It should be appreciated that the buttons 302-308 and the transitions between the closed state, the overlaid state, the pinned state, and the expanded state are merely examples and are not intended to be limited. For example, each of the states may include suitable interface elements enabling users to transition to and from any state and in any suitable order.

Figure 4:
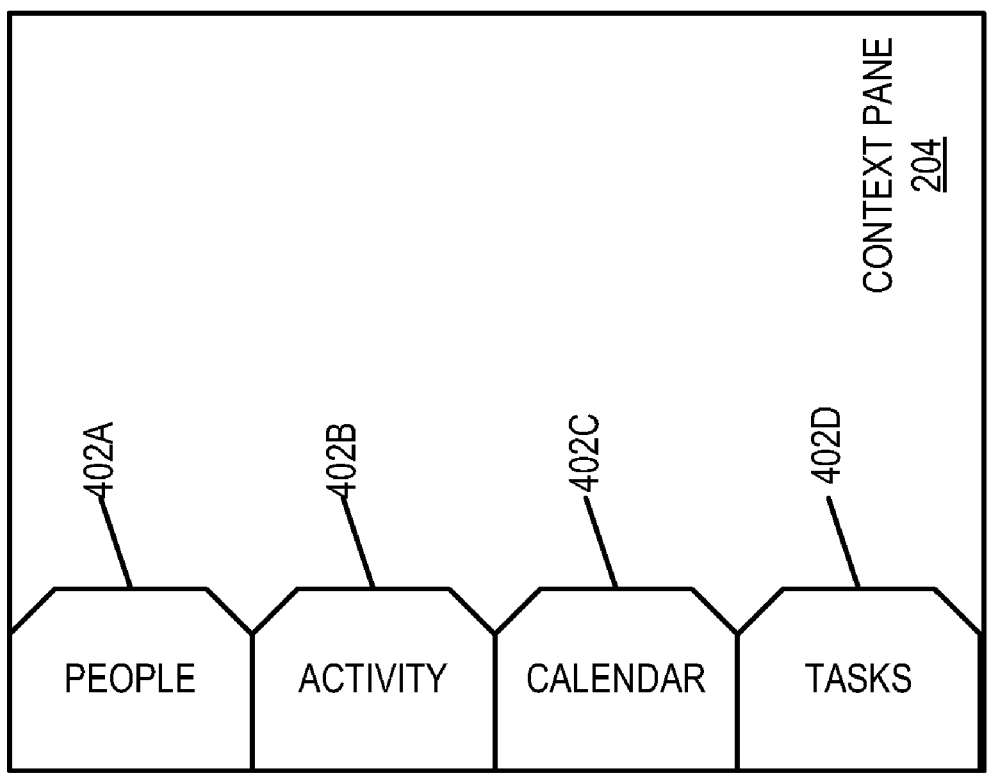
FIG. 4 is a diagram showing an example implementation of the context pane.

Turing now to FIG. 4, an illustrative implementation of the context pane 204 is shown. In particular, the context pane 204 may include a plurality of tabs, each of which corresponds to a data type of contextual data. As shown in FIG. 4, the context pane 204 includes a people tab 402A, an activity tab 402B, a calendar tab 402C, and a tasks tab 402D (collectively referred to as tabs 402). It should be appreciated that the tabs 402 and the corresponding data types illustrated in FIG. 4 are merely examples and not intended to be limiting. In other embodiments, the context pane 204 does not include the tabs 402.

In one embodiment, one of the tabs 402 may be depressed in order to select the corresponding data type. Upon selecting a data type, the contextual data associated with the data type is retrieved from the contextual data database 112 and is displayed in the context pane 204. For example, selecting the people tab 402A may cause the context pane 204 to display people who can view, edit, and/or comment on the content displayed in the content pane 202. Further, selecting the activity tab 402B may cause the context pane 204 to display activities performed by the people who can view, edit, and/or comment on the content displayed in the content pane 202.

Figure 5A:
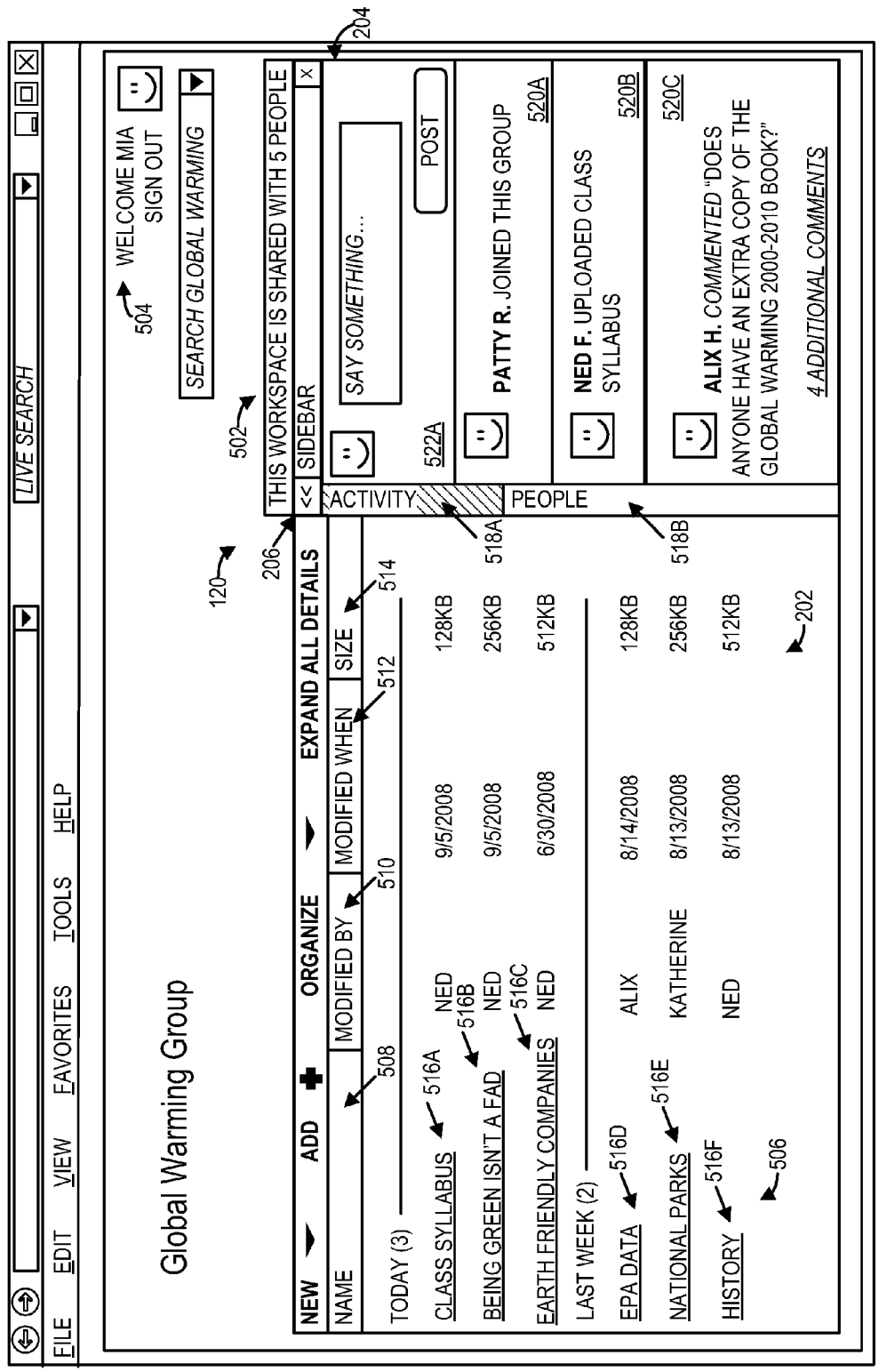
FIGS. 5A-5B are illustrative screen diagrams showing an example implementation of the two-state configuration illustrated in FIGS. 2A-2B.
Figure 5B:
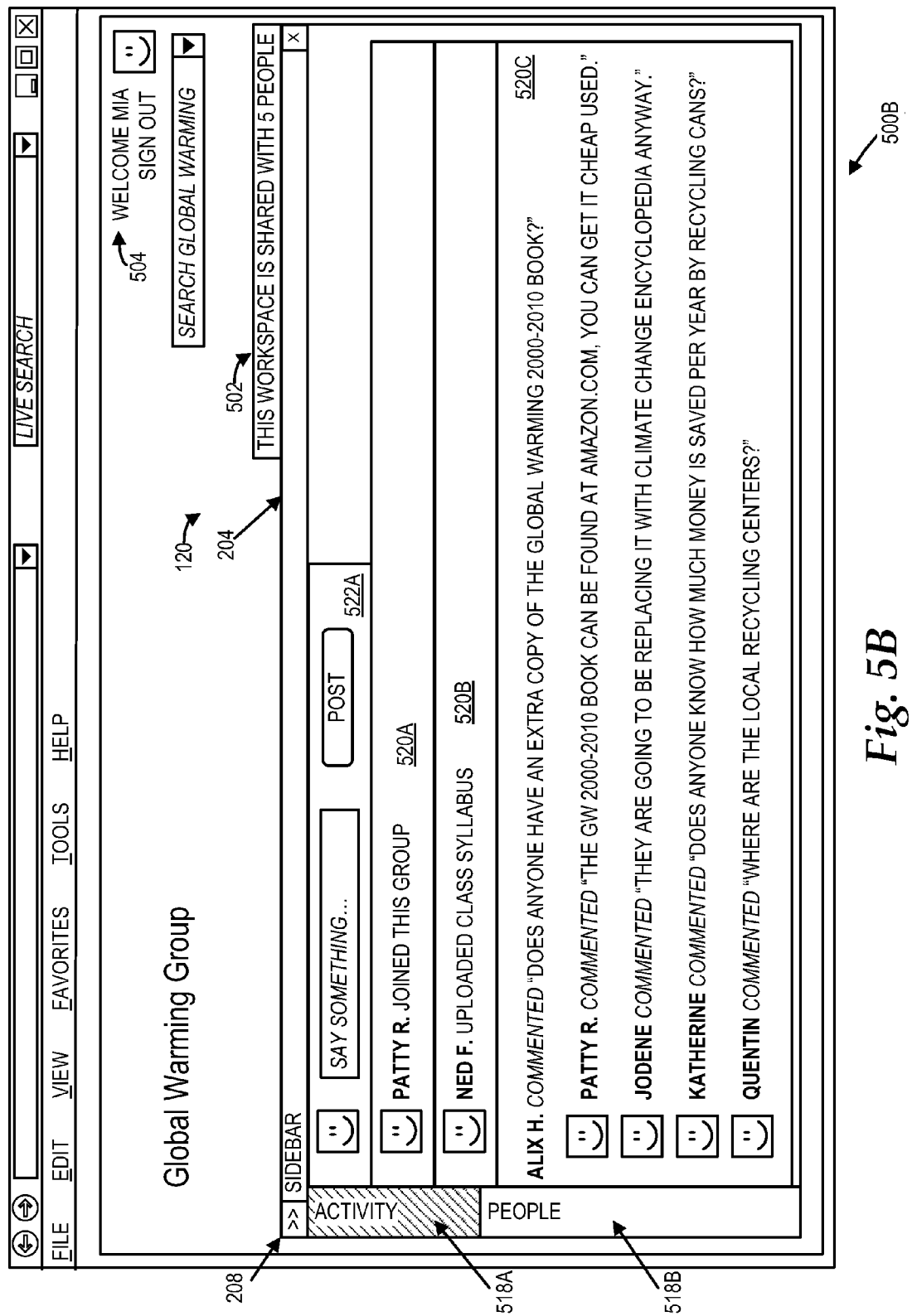

Turning now to FIGS. 5A and 5B, illustrative states of the content interface 120 are shown. In particular, FIG. 5A is an interface diagram 500A showing an example implementation of the content interface 120 in the pinned state as previously described with respect to FIG. 2A. FIG. 5B is an interface diagram 500B showing an example implementation of the content interface 120 in the expanded state as previously described with respect to FIG. 2B.

In FIG. 5A, the interface diagram 500A includes a content pane 202 and a context pane 204. The content pane 202 and the context pane 204 are associated with a particular workspace identified as the Global Warming Group. As indicated at 502, the Global Warming Group is limited to five people. The interface diagram 500A shows the content pane 202 and the context pane 204 through a traditional web browser, such as INTERNET EXPLORER from MICROSOFT CORPORATION, FIREFOX from MOZILLA CORPORATION, or SAFARI from APPLE INC. As indicated at 504, a user named "Mia" has logged into her personal account in the Global Warming Group.

The content pane 202 displays a document grid 506 containing of list of multiple documents identified by a document name 508, a person who last modified the document 510, a date when the document was last modified 512, and a size of the document 514. In particular, the document grid 506 contains a first document 516A, a second document 516B, a third document 516C, a fourth document 516D, a fifth document 516E, and a sixth document 516F (collectively referred to as documents 516). In one embodiment, each of the documents 516 are selectable via a suitable input device, such as a mouse. Upon receiving a selection of one of the documents 516, the content pane 202 may replace the document grid 506 with a view of the selected document.

As illustrated in FIG. 5A, the context pane 204 displays contextual data associated with the documents 516 displayed in the document grid 506. In particular, the context pane 204 displays contextual data according to whether an activity tab 518A or a people tab 518B (collectively referred to as tabs 518) is selected. In this example, the activity tab 518A has been selected as indicated by the shading in the activity tab 518A. As a result, the context pane 204 shows a list of activities related to the documents 516.

In FIG. 5A, the context pane 204 displays three activities: a first activity 520A in which Patty joins the Global Warming Group, a second activity 520B in which Ned uploads the first document 516A named "Class Syllabus," and a third activity 520C in which Alix posted a question. The third activity 520C also shows that four follow-up comments have been posted in response to the Alix's question. The context pane 204 further includes a post section 522 enabling the user Mia to post a comment regarding the documents 516.

As previously described, the content interface 120 in FIG. 5A is in the pinned state. In the pinned state, the context pane 204 may display a summary of relevant contextual data or a portion of relevant contextual data. For example, as illustrated in FIG. 5A, the third activity 520C shows Alix's question and indicates that four follow-up comments have been posted in response to the Alix's question. However, the context pane 204 does not show the text of the follow-up comments. In order to view the text of the follow-up comments, the user may depress the expansion button 206 to covert the content interface 120 from the pinned state into the expanded state.

In FIG. 5B, the context pane 204 utilizes the entire content interface 120 as specified by the expanded state. In the expanded state, the context pane 204 provides a more complete view of the contextual data. In particular, the context pane 204 in FIG. 5B displays the same activities 520 as displayed in FIG. 5A. However, in the expanded state, the context pane 204 also displays the follow-up comments in response to Alix's question. The user can transform the content interface 120 back to the pinned state by depressing the collapse button 208.

Figure 6:
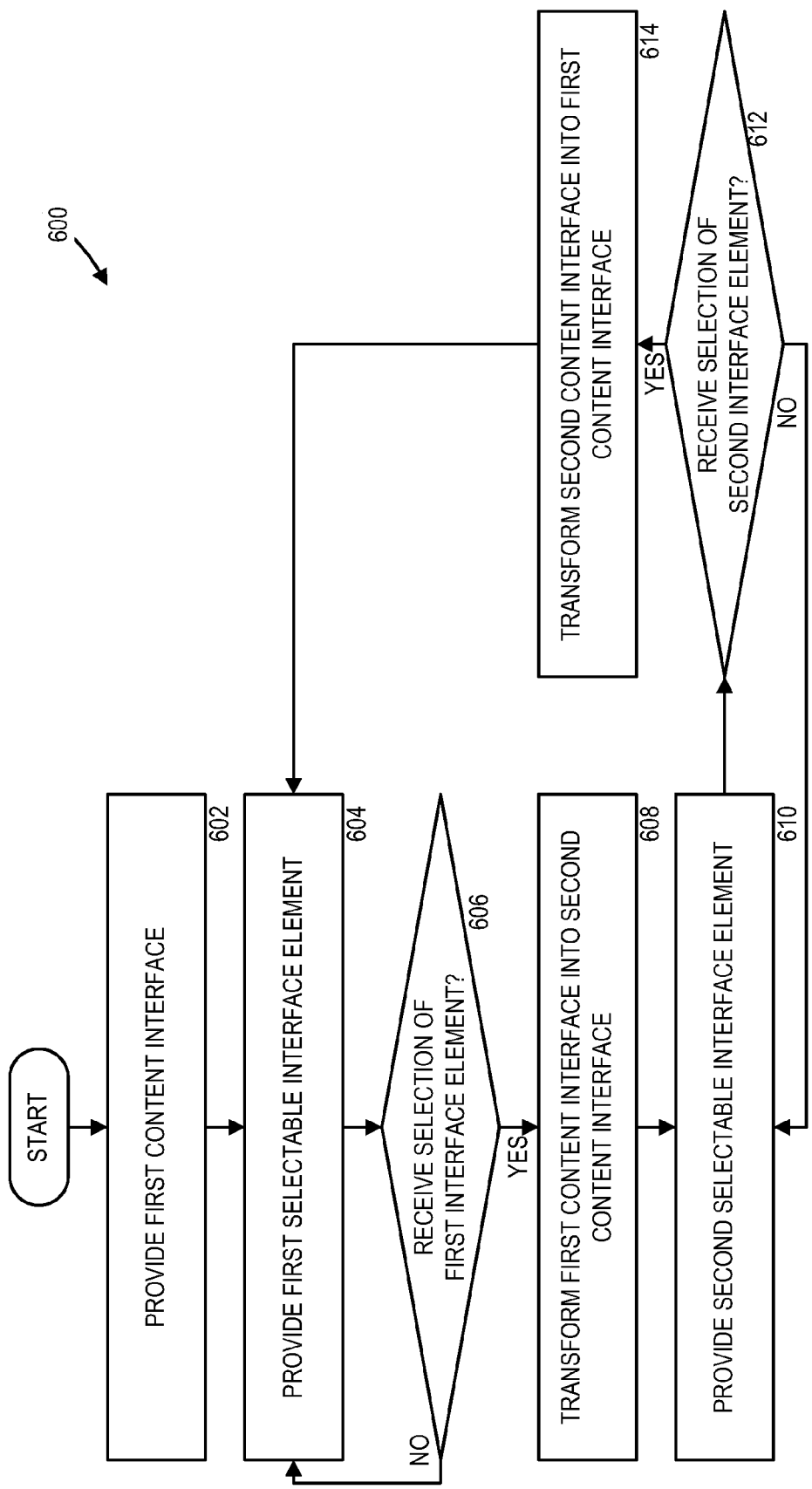
FIG. 6 is a flow diagram showing an illustrative process for providing a context pane with semantic zoom, in accordance with one embodiment.

Referring now to FIG. 6, additional details will be provided regarding the embodiments presented herein for providing a content pane with semantic zoom. In particular, FIG. 6 is a flow diagram illustrating one method for providing transforming from one state of the content interface to another state of the content interface. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

The routine 600 beings at operation 602, where the content interface 120 is provided in a first state, such as the pinned state illustrated in FIG. 2A. The first state is referred to in FIG. 6 as a first content interface. In one embodiment, the first content interface provides particular level of richness of contextual data (e.g., a less rich view of contextual data). At operation 604, the content interface 120 further provides a first selectable interface element, such as the expansion button 206. At operation 606, a determination is made whether the first interface element has been selected. If it is determined that the first interface element has been selected, then the routine 600 proceeds to operation 608. If it is determined that the first interface element has not been selected, the routine 600 loops back to operation 604.

At operation 608, the content interface 120 is transformed from the first state into a second state, such as the expanded state illustrated in FIG. 2B. The second state is referred to in FIG. 6 as a second content interface. In one embodiment, the second content interface provides another level of richness of contextual data (e.g., a richer view of contextual data). At operation 610, the content interface 120 further provides a second selectable interface element. At operation 612, a determination is made whether the second interface element has been selected. If it is determined that the second interface element has been selected, then the routine 600 proceeds to operation 614. If it is determined that the second interface element has not been selected, the routine 600 loops back to operation 610.

At operation 614, the content interface 120 is transformed from the second state back to the first state, and the routine 600 returns to operation 604. It should be appreciated that the routine 600 may be similarly utilized for any suitable number states and any suitable number of interface elements for transitioning between the states.

Figure 7:
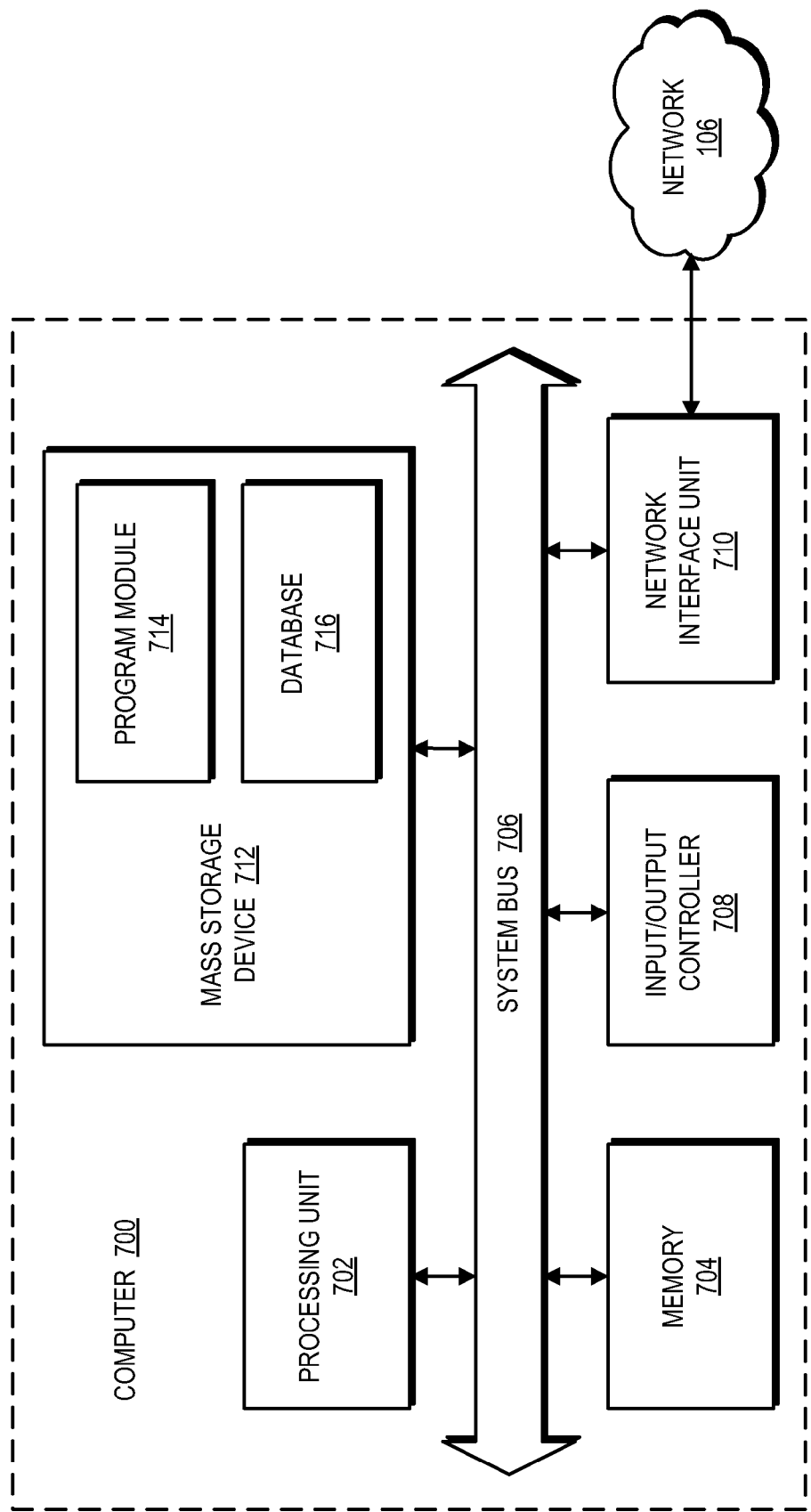
FIG. 7 is a computer architecture diagram showing an illustrative computer hardware architecture for a computing system capable of implementing the embodiments presented herein.

Referring now to FIG. 7, an exemplary computer architecture diagram showing a computer 700 is illustrated. Examples of the computer 700 may include the server computer 102 and the client computer 104. The computer 700 includes a processing unit 702 ("CPU"), a system memory 704, and a system bus 706 that couples the memory 704 to the CPU 702. The computer 700 further includes a mass storage device 712 for storing one or more program modules 714 and one or more databases 716. Examples of the program modules 714 may include the web server application 108 and the web client application 122. The routine 600 may also be embodied in a program module and executed by the computer 700. Examples of the databases 716 may include the content database 110 and the contextual data database 112. The mass storage device 712 is connected to the CPU 702 through a mass storage controller (not shown) connected to the bus 706. The mass storage device 712 and its associated computer-readable media provide non-volatile storage for the computer 700. Although the description of computer-readable media contained herein refers to a mass storage device, such as a hard disk or CD-ROM drive, it should be appreciated by those skilled in the art that computer-readable media can be any available computer storage media that can be accessed by the computer 700.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 700.

According to various embodiments, the computer 700 may operate in a networked environment using logical connections to remote computers through a network such as the network 106. The computer 700 may connect to the network 106 through a network interface unit 710 connected to the bus 706. It should be appreciated that the network interface unit 710 may also be utilized to connect to other types of networks and remote computer systems. The computer 700 may also include an input/output controller 708 for receiving and processing input from a number of input devices (not shown), including a keyboard, a mouse, a microphone, and a game controller. Similarly, the input/output controller 708 may provide output to a display or other type of output device (not shown).

Based on the foregoing, it should be appreciated that technologies for providing a context pane with semantic zoom are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing a context pane with semantic zoom, the method comprising:
providing a content interface comprising a content pane and a context pane, the content pane adapted to provide content, the context pane adapted to display a richness of contextual data associated with the content using a plurality of selectable tabs in the context pane, each of the plurality of selectable tabs corresponding to a category of contextual data;
providing a database storing the contextual data, wherein the contextual data includes data identifying users who are authorized to access the content and data corresponding to activities performed by the users who are authorized to access the content;
displaying a list of the users permitted to access the content as a first category of contextual data upon receiving a selection of one of the plurality of selectable tabs and displaying an activity stream showing activities performed by users in the list of the users permitted to access the content upon receiving a selection of another one of the plurality of selectable tabs;
providing a selectable interface element in the content interface, wherein the selectable interface element is adapted to modify size of the context pane;
receiving a selection of the interface element; and
automatically transforming the context pane from displaying the richness of contextual data into displaying another richness of contextual data upon receiving the selection of the interface element, wherein the richness of contextual data and the another richness of contextual data comprise displaying the activity stream showing activities in different levels of detail.

2. The computer-implemented method of claim 1, wherein the richness of contextual data and the another richness of contextual data comprise a less rich view of contextual data and a richer view of contextual data.

3. The computer-implemented method of claim 2, wherein the less rich view of the contextual data comprises a reduced granularity of information; and wherein the richer view of the contextual data comprises a greater granularity of information.

4. The computer-implemented method of claim 2, wherein the less rich view of the contextual data comprises a reduced amount of information; and wherein the richer view of the contextual data comprises a greater amount of information.

5. The computer-implemented method of claim 2, wherein the less rich view of the contextual data comprises a reduced number of information types; and wherein the richer view of the contextual data comprises a greater number of information types.

6. The computer-implemented method of claim 1, further comprising:
providing a plurality of selectable tabs in the context pane, each of the tabs corresponding to a category of contextual data; and
upon receiving a selection of one of the selectable tabs, displaying in the context pane contextual data associated with the corresponding category.

7. The computer-implemented method of claim 1, wherein the contextual data comprises an activity stream showing activities performed by users in the list of users permitted to access the content associated with a workspace.

8. The computer-implemented method of claim 1, wherein the content displayed in the content pane comprises content associated with the contextual data displayed in the context pane.

9. The computer-implemented method of claim 8, wherein the contextual data displayed in the context pane is subordinate to the content displayed in the content pane.

10. A computer-implemented method for providing a context pane with semantic zoom, the method comprising:
providing one or more selectable interface elements corresponding to a plurality of states of a content interface, the interface elements operative to transform the content interface between the plurality of states, the states of the content interface corresponding to different size configurations of a content pane and a context pane, the different size configurations of the content pane and the context pane corresponding to a different richness of contextual data displayed in the context pane;
providing a database storing the contextual data, wherein the contextual data includes data identifying users who are authorized to access content displayed in the content pane and data corresponding to activities performed by the users who are authorized to access the content;
providing a plurality of selectable tabs in the context pane, each of the tabs corresponding to a category of contextual data;
displaying a list of the users permitted to access the content as a first category of contextual data upon receiving a selection of one of the plurality of selectable tabs and displaying an activity stream showing activities performed by users in the list of the users permitted to access the content upon receiving a selection of another one of the plurality of selectable tabs;
receiving a selection of one of the interface elements; and
transforming between the states of the content interface according to the selected interface element, wherein said transforming between the states of the content interface comprises displaying the activity stream showing activities in different levels of detail.

11. The computer-implemented method of claim 10, wherein the plurality of states of the content interface comprise a first state of the content interface and a second state of the content interface; and the method further comprising:
upon receiving a selection of the interface element corresponding to the first state of the content interface, providing the first state of the content interface comprising a smaller context pane adapted to display a less rich view of the contextual data; and
upon receiving a selection of the interface element corresponding to the second state of the content interface, providing the second state of the content interface comprising a larger context pane adapted to display a richer view of the contextual data.

12. The computer-implemented method of claim 11, wherein the first state of the content interface comprises a larger content pane adapted to display a greater amount of content; and wherein the second state of the content interface comprises a smaller content pane adapted to display a reduced amount of the content.

13. The computer-implemented method of claim 11, wherein the less rich view of the contextual data comprises a summary of information; and wherein the richer view of the contextual data comprises the information.

14. The computer-implemented method of claim 11, wherein the content displayed is associated with the contextual data displayed.

15. The computer-implemented method of claim 14, wherein the contextual data displayed is subordinate to the content displayed.

16. A computer-readable medium having computer-executable instructions stored thereon which, when executed by a computer, cause the computer to:
provide a first state of a content interface comprising a larger content pane and a smaller context pane, the larger content pane adapted to display a greater amount of content, the smaller context pane adapted to display a less rich view of contextual data associated with the greater amount of content using a plurality of selectable tabs in the context pane, each of the plurality of selectable tabs corresponding to a category of contextual data;
provide a second state of the content interface comprising a smaller content pane and a larger context pane, the smaller content pane adapted to display a reduced amount of content, the larger context pane adapted to display a richer view of contextual data associated with the reduced amount of content;
provide one or more selectable interface elements for transforming between the first state of the content interface and the second state of the content interface;
provide a database storing contextual data, wherein the contextual data includes data identifying users who are authorized to access the content displayed in the content pane and data corresponding to activities performed by the users who are authorized to access the content;
display a list of the users permitted to access the content as a first category of contextual data upon receiving a selection of one of the plurality of selectable tabs and display an activity stream showing activities performed by users in the list of the users permitted to access the content upon receiving a selection of another one of the plurality of selectable tabs; and
receive a selection of one of the selectable interface elements; and
transform between the first state and the second state of the content interface according to the selected interface element upon receiving the selection of the interface element, wherein the transform between the first state and the second state of the content interface comprises displaying the activity stream showing activities in greater detail.

17. The computer-readable medium of claim 16, having further computer-executable instructions stored thereon which, when executed by the computer, cause the computer to:

provide a third state of the content interface comprising a full-sized content pane and a minimized context pane, the full-sized content pane adapted to display a maximum amount of content;

provide a fourth state of the content interface comprising a minimized content pane and a full-sized context pane, the full-sized context pane adapted to display a maximum richness of contextual data; and upon receiving the selection of one of the interface elements, transform between the first state, the second state, the third state, and the fourth state of the content interface according to the selected interface element, the interface elements being further adapted to transform between the first state, the second state, the third state, and the fourth state of the content interface.

* * * * *